(12) United States Patent
Shang (10) Patent No.: US 11,777,997 B2
(45) Date of Patent: Oct. 3, 2023

(54) METHOD, APPARATUS, DEVICE AND STORAGE MEDIUM OF DATA ACQUISITION

(71) Applicant: BEIJING BYTEDANCE NETWORK TECHNOLOGY CO., LTD., Beijing (CN)

(72) Inventor: Chaoyang Shang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/717,832

(22) Filed: Apr. 11, 2022

(65) Prior Publication Data

US 2023/0208886 A1    Jun. 29, 2023

(30) Foreign Application Priority Data

Dec. 24, 2021 (CN) .......................... 202111598171.5

(51) Int. Cl.
*H04L 29/06* (2006.01)
*H04L 9/40* (2022.01)
*H04L 9/32* (2006.01)
*H04L 61/59* (2022.01)

(52) U.S. Cl.
CPC ............ *H04L 63/205* (2013.01); *H04L 9/321* (2013.01); *H04L 61/59* (2022.05); *H04L 63/0281* (2013.01); *H04L 63/0823* (2013.01)

(58) Field of Classification Search
CPC .............. H04L 63/205; H04L 63/0281; H04L 63/0823; H04L 61/59; H04L 9/321
See application file for complete search history.

(56) References Cited

U.S. PATENT DOCUMENTS

| 2004/0006615 A1* | 1/2004 | Jackson | H04L 67/288 709/223 |
| 2008/0107249 A1* | 5/2008 | Kim | H04L 12/66 379/93.05 |
| 2009/0029728 A1* | 1/2009 | Shen | H04W 48/14 455/507 |
| 2010/0023652 A1* | 1/2010 | Kono | G06F 3/0604 711/E12.001 |
| 2011/0154477 A1* | 6/2011 | Parla | H04L 63/0272 726/15 |
| 2012/0272058 A1* | 10/2012 | Wang | H04L 63/0464 713/156 |
| 2014/0059206 A1* | 2/2014 | Venkateshwaran | H04L 69/162 709/224 |

(Continued)

*Primary Examiner* — Vance M Little (57) ABSTRACT

A method of data acquisition includes activating a local server proxy in a preset application program; acquiring a preset connection function, and replacing a destination address in the preset connection function with a target address corresponding to a local server proxy, to establish a connection between the preset application program and the local server proxy; establishing a connection between the local server proxy and a real server corresponding to the target address based on connection information received from the preset application program via the local server proxy; acquiring data during a procedure of data forwarding between the real server and the preset application program via the local server proxy.

16 Claims, 4 Drawing Sheets

(56) References Cited

U.S. PATENT DOCUMENTS

| 2014/0172809 A1* | 6/2014 | Gardella | G06F 16/27 |
| | | | 707/705 |
| 2017/0237601 A1* | 8/2017 | Zhu | H04L 12/4633 |
| | | | 709/223 |
| 2020/0186500 A1* | 6/2020 | Neystadt | H04L 67/02 |
| 2022/0109730 A1* | 4/2022 | Zheng | H04L 67/141 |

* cited by examiner

METHOD, APPARATUS, DEVICE AND STORAGE MEDIUM OF DATA ACQUISITION

FIELD

Embodiments of the present disclosure relate to the field of computer technology, and particularly to a method, apparatus, device and storage medium of data acquisition.

BACKGROUND

With a rapid development of the Internet technology, many application programs have a networking function. To ensure network security during the running of the application programs, a data packet usually needs to be acquired for further analysis.

However, current data acquisition techniques for the application programs all depend on an external tool. It is difficult to acquire the data in the application programs so that the acquired data has problems such as poor readability. Therefore, the existing data acquisition solutions are not sound.

SUMMARY

Embodiments of the present disclosure provide a method, apparatus, storage medium and device of data acquisition, which may optimize the existing data acquisition solutions.

In a first aspect, embodiments of the present disclosure provide a method of data acquisition, comprising: activating a local server proxy in a preset application program; in accordance with a determination that the preset application program invokes a preset connection function, acquiring the preset connection function, and replacing a destination address in the preset connection function with a target address corresponding to the local server proxy, to establish a connection between the preset application program and the local server proxy, wherein the target address is pre-written in the preset application program; establishing a connection between the local server proxy and a real server corresponding to the target address based on connection information received from the preset application program via the local server proxy; and acquiring data during a procedure of data forwarding between the real server and the preset application program via the local server proxy.

In a second aspect, embodiments of the present disclosure provide a data acquisition apparatus, comprising: a local server proxy activation module configured to activate a local server proxy in a preset application program; a first connection module configured to, in accordance with a determination that the preset application program invokes a preset connection function, acquire the preset connection function, and replace a destination address in the preset connection function with a target address corresponding to the local server proxy, to establish a connection between the preset application program and the local server proxy, wherein the target address is pre-written in the preset application program; a second connection module configured to establish a connection between the local server proxy and a real server corresponding to the target address based on connection information received from the preset application program via the local server proxy; a data acquisition module configured to acquire data during a procedure of data forwarding between the real server and the preset application program via the local server proxy.

In a third aspect, embodiments of the present disclosure provide an electronic device, comprising a memory, a processor and a computer program stored on the memory and running on the processor, wherein the processor implements the data acquisition method according to embodiments of the present disclosure upon executing the computer program.

In a fourth aspect, embodiments of the present disclosure provide a computer readable storage medium on which a computer program is stored, wherein the program, when executed by a processor, implements the data acquisition method according to embodiments of the present disclosure.

According to the data acquisition solution provided by embodiments of the present disclosure, a local server proxy is activated in a preset application program; in accordance with a determination that the preset application program invokes a preset connection function, the preset connection function is acquired, and a destination address in the preset connection function is replaced with a target address corresponding to a local server proxy, to establish a connection between the preset application program and the local server proxy, wherein the target address is pre-written in the preset application program; connection information transmitted by the preset application program is received via the local server proxy, and a connection between the local server proxy and a real server corresponding to the target address is established based on connection information received from the preset application program via the local server proxy, and data is acquired during a procedure of data forwarding between the real server and the preset application program via the local server proxy. By employing the above technical solution, the acquisition mechanism may be realized in the application program without the aid of an external tool, and the data may be forwarded between the application program and the real server by using the local server proxy in the application program, and more accurate network data with stronger readability can be achieved in the forwarding process to facilitate data analysis.

DETAILED DESCRIPTION OF EMBODIMENTS

Embodiments of the present disclosure will be described as follows in greater detail with reference to the drawings. Although some embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

It should be understood that various steps described in method embodiments of the present disclosure may be performed in different orders and/or in parallel. Furthermore, method embodiments may include additional steps and/or the shown steps may be omitted without execution. The scope of the present disclosure is not limited in this regard.

As used herein, the term "comprises" and its variants are to be read as open-ended terms that mean "comprises, but is not limited to." The term "based on" is to be read as "based at least in part on." The term "one example implementation" and "an example implementation" are to be read as "at least one example implementation." The term "another implementation" is to be read as "at least one other implementation." The term "some embodiments" means "at least some embodiments". Relevant definitions of other terms will be given in the description below.

It should be noted that the concepts such as "first" and "second" mentioned in the present disclosure are only used to distinguish different devices, modules or units, and are not used to limit the order of functions performed by these devices, modules or units or interdependence thereof.

It should be noted that modifications of "a" and "a plurality of" mentioned in the present disclosure are illustrative rather than restrictive, and those skilled in the art should understand that unless the context clearly indicates otherwise, they should be understood as "one or a plurality of".

The names of messages or information exchanged between a plurality of devices in the embodiments of the present disclosure are only for illustrative purposes, and are not intended to limit the scope of these messages or information.

In the following embodiments, optional features and examples are provided in each embodiment at the same time, the features described in the embodiments can be combined to form a plurality of optional solutions, and each numbered embodiment should not be regarded as only for one technical solution.

Figure 1:
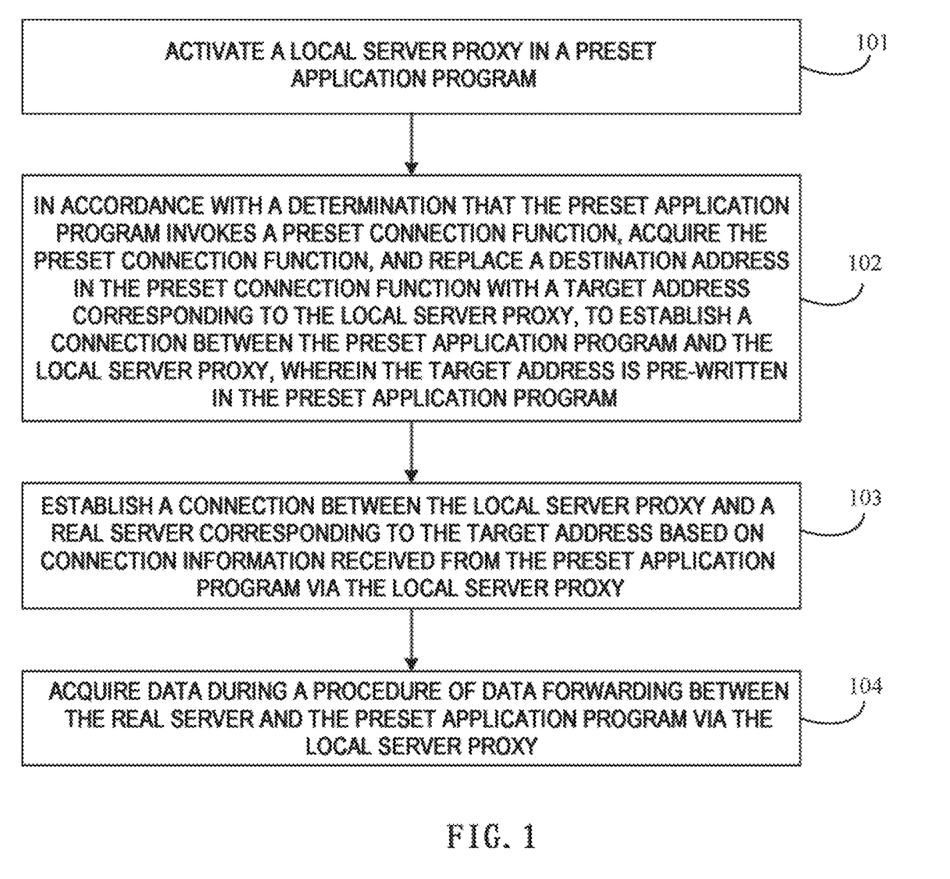
FIG. 1 is a flowchart of a method of data acquisition according to an embodiment of the present disclosure.

FIG. 1 is a flowchart of a method of data acquisition according to an embodiment of the present disclosure. The method can be applied to a preset application program and can be executed by a data acquisition apparatus, wherein the apparatus can be implemented by software and/or hardware, and can generally be integrated in an electronic device. The electronic device may be a mobile device such as a mobile phone, a smart watch, a tablet computer, and a personal digital assistant, or may also be other devices such as desktop computer.

As shown in FIG. 1, the method comprises:

Step 101: activate a local server proxy in a preset application program.

Exemplarily, the preset application program may be any application program with a network access function. The preset application program is loaded in an operating system, and the specific type of the operating system is not limited, for example, it may include Unix, Linux, Apple (iOS, macOS or OS X) and Android, etc. For the convenience of illustration, Android will be taken as an example below.

In the embodiment of the present disclosure, the local server proxy may be understood as a proxy server implemented in the preset application program. In a development stage of the preset application program, relevant code for implementing the local server proxy may be pre-written, including a target address corresponding to the local server proxy. The target address may include an Internet Protocol (IP) address corresponding to a local network card of the electronic device, for example, 127.0.0.1.

Exemplarily, after the preset application program is activated, the local server proxy may be activated, and the local server proxy may be bound to the target address to acquire network data via the local server proxy.

Step 102: in accordance with a determination that the preset application program invokes a preset connection function, acquire the preset connection function, and replace a destination address in the preset connection function with a target address corresponding to the local server proxy, to establish a connection between the preset application program and the local server proxy, wherein the target address is pre-written in the preset application program.

Exemplarily, the application program needs to use a socket when implementing the network capability. The socket is an Application Programming Interface (API) for inter-process communication in a network environment, also called a socket interface. The socket is an underlying interface for network capabilities on many system platforms. The implementation of the socket comprises a connection function, also called a connect method. As the implementation of the socket, the connection function may be used to establish a connection with the corresponding socket. When the application program needs to invoke the socket upon initiating a connection action of a network request, the connection function corresponding to the socket may be invoked.

Exemplarily, the preset connection function may be understood as a connection function called when the preset application program initiates the network request. In the preset connection function, the original request address (i.e., a destination address) is the address of a real server, and the real server may be understood as a remote server with which the preset application program needs to establish a network connection. In the embodiment of the present disclosure, the preset connection function is acquired and the destination address therein is replaced with the target address corresponding to the local server proxy, so that the preset application program (which may be understood here as a network function-related module in the preset application program, for example, a module for initiating the network request or a module that needs to establish a network connection with the remote server) may be connected to the target address, i.e., establish a connection with the local server proxy without being directly connected to the real server. A specific connection manner may be determined according to the protocol type corresponding to the network request initiated by the preset application program, and the protocol type may for example include a Transmission Control Protocol (TCP), a User Datagram Protocol (UDP), a live broadcast protocol or a file download protocol, etc.

It should be appreciated that due to the increasingly rich functions of the application program, the same preset application program might initiate network requests based on different network protocols during the running process, that is, needs to establish network connections with real server based on different protocols. In the development stage of the preset application program, the implementation codes based on different network protocols may be pre-integrated in the local server proxy. When it is necessary to establish a connection between the proxy real server and the preset application program, the corresponding implementation code is used to establish a connection with the preset application program based on the protocol type corresponding to the current network request.

Step 103: establish a connection between the local server proxy and a real server corresponding to the target address based on connection information received from the preset application program via the local server proxy.

Exemplarily, after the preset application program is connected to the local server proxy, the connection information is transmitted to the local server proxy. The specific content contained in the connection information is not limited, and may be determined according to the specific type of the network request. For example, if the network request is a request to download a file, the corresponding connection information may include relevant information such as an address of the file on the real server, a Uniform Resource Locator (URL), a file format and a file size. The local server proxy may initiate a corresponding network request to the real server based on the connection information, thereby establishing the network connection between the local server proxy and the real server.

Step 104: acquire data during a procedure of data forwarding between the real server and the preset application program via the local server proxy.

Exemplarily, the network data transmitted by the preset application program to the real server will be transmitted to the local server proxy, and the local server proxy will forward the network data to the real server; the network data returned by the real server to the preset application program will be returned to the local server proxy first, and then forwarded by the local server proxy to the preset application program. In the process of data forwarding, the local server proxy may acquire data, i.e., complete the acquisition of a data packet. Since the acquisition is performed in the preset application program, the accuracy and readability of the acquired data can be guaranteed.

In the data acquisition method provided in the embodiment of the present disclosure, the local server proxy is activated in the preset application program. When it is detected that the preset application program invokes a preset connection function, the preset connection function is acquired, and the destination address in the preset connection function is replaced with a target address corresponding to the local server proxy to establish a connection between the preset application program and the local server proxy, wherein the target address is pre-written in the preset application program, the connection information transmitted by the preset application program is received via the local server proxy, the connection between the local server proxy and the real server corresponding to the target address is established based on the connection information, the data is forwarded between the real server and the preset application program via the local server proxy, and the data is acquired in the forwarding process. By employing the above technical solution, the acquisition mechanism may be realized in the application program without the aid of an external tool, and the data may be forwarded between the application program and the real server by using the local server proxy in the application program, and more accurate network data with stronger readability can be acquired in the forwarding process to facilitate data analysis.

In some embodiments, the local server proxy has a built-in preset digital certificate, and forwarding data between the real server and the preset application program via the local server proxy and acquiring data during the forwarding process comprises: performing key negotiation with the preset application program via the local server proxy based on the preset digital certificate to obtain a first negotiation result; performing key negotiation with the real server via the local server proxy based on the preset digital certificate to obtain a second negotiation result; receiving first data transmitted by the preset application program via the local server proxy and decrypting the first data based on the first negotiation result to obtain second data, encrypting the second data according to the second negotiation result to obtain third data, and transmitting the third data to the real server; wherein the second data are the data acquired during the procedure of data forwarding. The advantage of such setting is that by building a set of digital certificate in the local server proxy, the decryption and encryption of network data may be achieved, thereby facilitating acquiring more real network data that the preset application program intends to transmit to the real server.

In related technologies, data acquisition technologies for the application programs all rely on an external tool. For a encrypted data packet, such as a Hyper Text Transfer Protocol over SecureSocket Layer (HTTPS) encrypted packet, a Transport Layer Security (TLS) encrypted packet and a Secure Sockets Layer (SSL) encrypted packet, etc., an external acquisition tool cannot perform decryption, so it is inconvenient to parse the data, and it is difficult to analyze the data packet.

In the embodiment of the present disclosure, a set of digital certificate may be built in the local server proxy, and referred to as a preset digital certificate. Relative to the preset application program, the preset digital certificate may be regarded as a digital certificate on the server side. The local server proxy may perform key negotiation with the preset application program based on the preset digital certificate. Relative to the real server, the preset digital certificate may be regarded as a digital certificate on the client side, and the local server proxy may perform key negotiation with the real server based on the preset digital certificate. When the preset application program intends to transmit data to the real server (referred to as the second data here), the second data may be encrypted in an encryption manner (which may be included in the first negotiation result) duly negotiated with the local server proxy to obtain the first data and forward the first data to the local server proxy; the local server proxy may decrypt the first data to obtain decrypted real data, namely, unencrypted second data. Then, the local server proxy encrypts the second data in an encryption manner (which may be included in the second negotiation result) duly negotiated by the real server to obtain the third data and forward the third data to the real server to achieve data forwarding. It may be appreciated that the second data is network data that the preset application program intends to transmit to the real server, and the acquisition of the second data may facilitate performing processing such as relevant analysis.

In some embodiments, forwarding data between the real server and the preset application program via the local server proxy and acquiring data during the forwarding process further comprises: receiving fourth data transmitted by the real server via the local server proxy, decrypting the fourth data according to the second negotiation result to obtain fifth data, encrypting the fifth data based on the first negotiation result to obtain sixth data, and forwarding the sixth data to the real server; wherein the fifth data are the data acquired during the procedure of data forwarding. The advantage of such setting lies in facilitating acquiring more real network data that the real server intends to transmit to the preset application program.

In some embodiments, before detecting that the preset application program invokes the preset connection function, the method further comprises: loading a first core library in the preset application program, wherein the first core library achieves centralized management of the invoking of a preset socket by injecting a proxy connection function in the first core library into a second core library, the second core library contains a preset connection function, and the preset connection function is used to establish a connection with the preset socket; injecting a self-defined connection function into the second core library based on a preset injection approach corresponding to the proxy connection function, the self-defined connection function being used to achieve replacing the destination address of the preset connection function with a target address corresponding to the local server proxy. In accordance with a determination that the preset application program invokes the preset connection function, the acquiring the preset connection function and replacing the destination address of the preset connection function with the target address corresponding to the local server proxy comprises: in accordance with a determination that the preset application program invokes the preset connection function through the second core library, replacing invoking the preset connection function with invoking the self-defined connection function to achieve replacing the destination address of the preset connection function with the target address corresponding to the local server proxy. The advantage of such setting lies in, instead of injecting the self-defined code at each position that needs to invoke the preset connection function to achieve the acquisition purpose, using a preset injection approach of injecting the proxy connection function into the second core library to inject the self-defined connection function into the second core library so that the self-defined connection function can have a function of the proxy connection function to achieve centralized management of the invoking of the preset connection function, i.e., one injection of the self-defined connection function can achieve a code-acquiring effect corresponding to a batch of injections of a plurality of preset connection functions, thereby reducing the number of injections for acquiring the code of the connection function and ensuring the stability and performance of the application program.

Exemplarily, the core library may also be referred to as a kernel library, which may be understood as a library for providing a basic function in an operating system. The implementation of socket is in the second core library. In different operating systems, the name of the second core library may be different. Taking Android as an example, the second core library may be a Bionic library. The first core library is a core library different from the second core library. Since the socket needs to be invoked on many occasions, to facilitate management, the first core library may aggregate the sockets at the system level, and real implementation of the socket in the second core library is proxied into the first core library, the first core library may inject the implementation of its own socket (may called a proxy connection function) into the second core library so that when the connection function in the second core library is executed, the proxy connection function is executed first, thereby achieving the centralized management of the invoking of the socket. In different operating systems, the name of the second core library might be different. Taking Android as an example, the second core library may be a NetdClient library, and the corresponding library file may be a libnetd_client.so file. The preset application program may actively load the first core library after being started, or may load the first core library in accordance with a determination that a loading event of the first core library is triggered. Optionally, the loading timing of the second core library may be the same as or different from that of the first core library.

Exemplarily, the preset injection approach corresponding to the proxy connection function may be understood as an injection method capable of injecting the proxy connection function into the second core library, and the method may be written according to actual needs, and the injection method provided by the operating system may be reused. Optionally, the preset injection approach comprises a method provided by an operating system for injecting the proxy connection function in the first core library into the second core library.

Exemplarily, taking Android as an example, the preset injection approach comprises a NetdClientInitConnect approach. The approach is publicly disclosed by the Android operating system, and the preset application program may obtain the approach and then invoke the approach.

Exemplarily, the self-defined connection function may be injected into the second core library by invoking the preset injection approach.

In the embodiment of the present disclosure, it is possible to pre-write the self-defined connection function in the development stage of the preset application program. The function of the self-defined connection function is to realize a self-defined logic, and the self-defined logic may be understood as a logic required to implement acquisition. The specific content is replacing the destination address in the preset connection function with the target address corresponding to the local server proxy. The self-defined logic may exist in the self-defined connection function in the form of parameters, which may also be referred to as self-defined parameters. The self-defined parameters may specifically be functions or related codes for implementing the self-defined logic.

Optionally, the self-defined connection function is injected in the form of a preset parameter. The preset parameter may be introduced upon invoking the preset injection approach. The present parameter may be understood as an object to be injected. The self-defined connection function is regarded as an injection object, i.e., the self-defined connection function is introduced into the preset injection approach, to achieve injection of the self-defined connection function into the second core library.

Exemplarily, upon initiating the network request, the preset application program needs to invoke the preset socket, and needs to invoke the corresponding preset connection function through the second core library. Since the self-defined connection function is already previously injected into the second core library, the original preset connection function called currently will not be executed directly, and instead, the self-defined connection function is executed first, thereby achieving replacing the destination address in the preset connection function with the target address corresponding to the local server proxy.

In some embodiments, the injecting the self-defined connection function into the second core library based on the preset injection approach corresponding to the proxy connection function comprises: searching for an address of the preset injection approach corresponding to the proxy connection function by employing a preset dynamic library symbol function; invoking the preset injection approach based on the address of the preset injection approach to inject the self-defined connection function into the second core library. The advantage of such setting is that the address of the preset injection approach provided by the operating system can be quickly and accurately found and called.

A function of the dynamic library symbol (dlsym) function is to operate a handle and a symbol according to a dynamic link library, and return an address corresponding to the symbol, which may obtain a function address of the as well as a variable address. The preset dynamic library symbol function may be understood as a dlsym function that is pre-written in the preset application program development stage and used to search for the address of the preset injection approach, for example, the dlsym function for searching for the address of the NetdClientInitConnect method.

In some embodiments, after replacing invoking the preset connection function with invoking the self-defined connection function to achieve replacing the destination address of the preset connection function with the target address corresponding to the local server proxy, the method further comprises: executing a system call of the preset connection function. The advantage of such setting lies in preventing a case in which the preset connection function is called again after the completion of the execution of the self-defined connection function is completed, and thus is replaced by the execution of the self-defined connection function again, resulting in an infinite loop of acquisition call.

Exemplarily, the system call (also referred to syscall) is a means for user to spatially access the kernel, and is a legal entry to the kernel. In the case where the preset connection function is called normally, it is possible to continue to call a relevant function of a system bottom layer (also called a kernel layer) by performing the corresponding system call, and finally achieve the function of the preset connection function. In the embodiment of the present disclosure, after invoking the self-defined connection function to implement the self-defined logic, the system call of the preset connection function is directly executed instead of returning to invoke the preset connection function, thereby preventing the occurrence of an infinite loop and ensuring normal operation of the preset application program.

Figure 2:
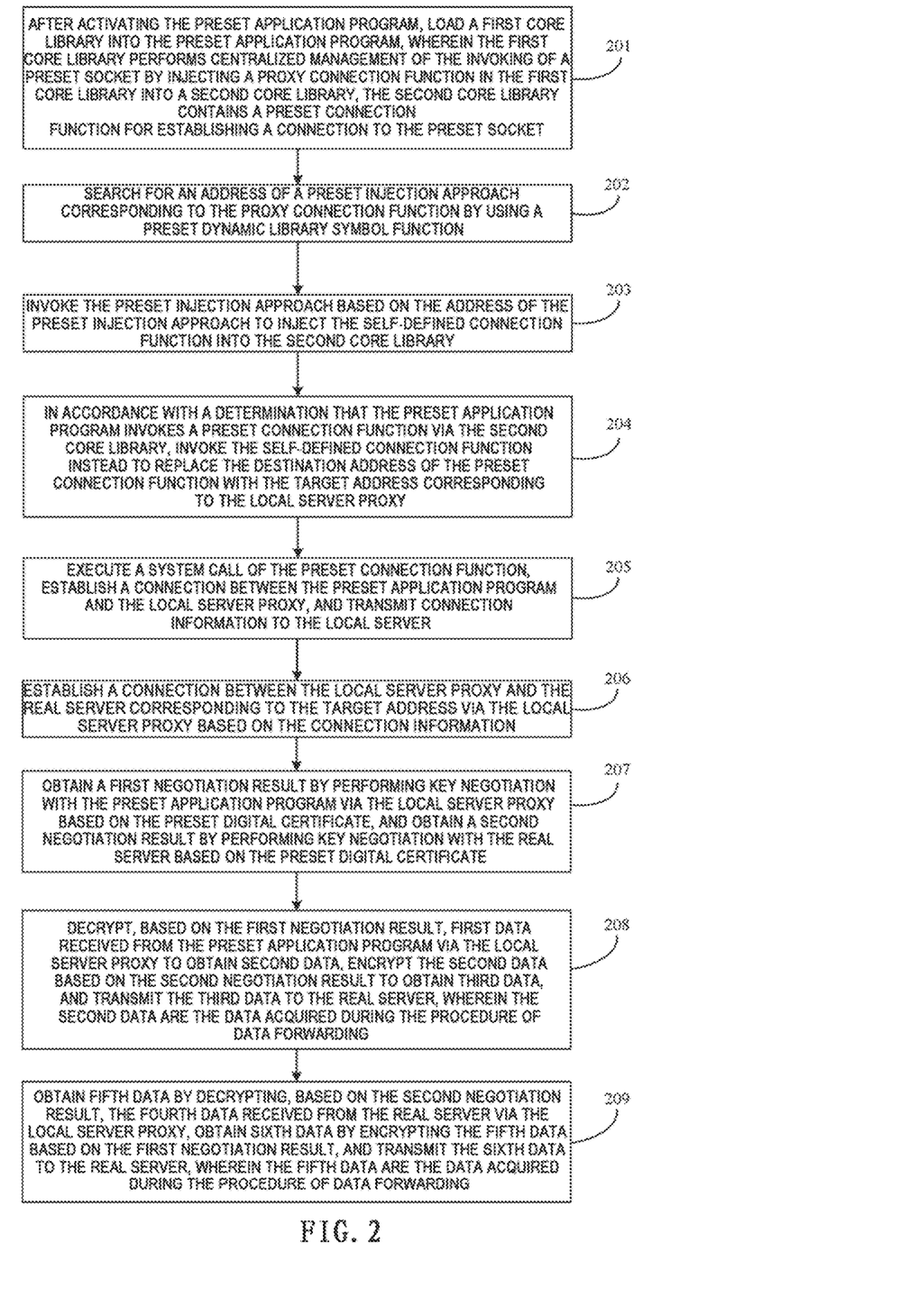
FIG. 2 is a flowchart of another data acquisition method according to an embodiment of the present disclosure.
Figure 3:
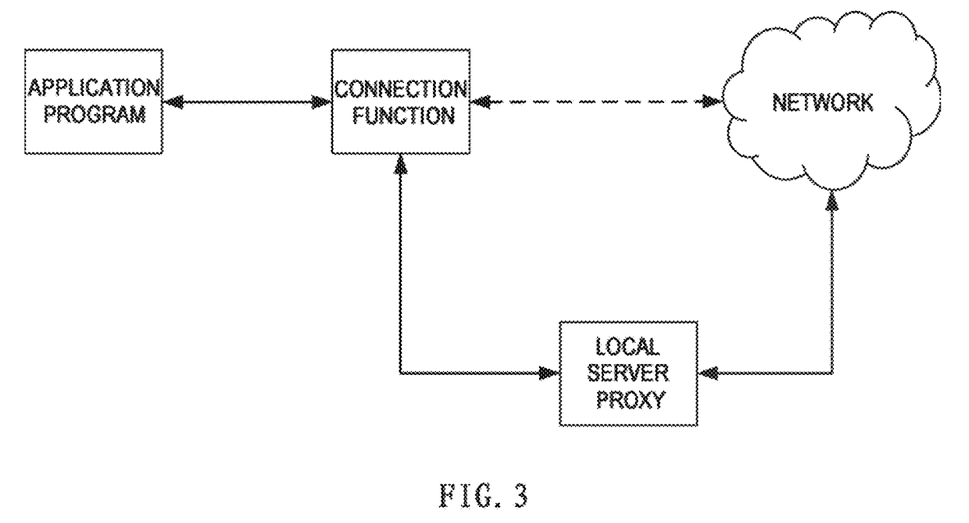
FIG. 3 is a schematic diagram of principles of a method of data acquisition according to an embodiment of the present disclosure.

FIG. 2 is a flowchart of another data acquisition method according to an embodiment of the present disclosure. An embodiment of the present disclosure is optimized based on optional solutions in the foregoing embodiments. FIG. 3 is a schematic diagram of principles of a method of data acquisition according to an embodiment of the present disclosure. The embodiment of the present disclosure may be understood with reference to FIG. 2 and FIG. 3.

Specifically, taking the Android operating system as an example, the method comprises the following steps:

Step 201: after activating the preset application program, load a first core library into the preset application program, wherein the first core library performs centralized management of the invoking of a preset socket by injecting a proxy connection function in the first core library into a second core library, the second core library contains a preset connection function for establishing a connection to the preset socket.

Exemplarily, after the preset application program is activated, the NetdClient library is actively loaded, that is, the libnetd_client.so file is loaded.

Step 202: search for an address of a preset injection approach corresponding to the proxy connection function by using a preset dynamic library symbol function.

Exemplarily, the preset dlsym function may be pre-written in the development stage of the preset application program, and the preset application program uses the preset dlsym function to search for the address of the NetdClientInitConnect method.

Step 203: invoke the preset injection approach based on the address of the preset injection approach to inject the self-defined connection function into the second core library.

The self-defined connection function is injected in the form of a preset parameter, and the self-defined connection function is used to achieve the replacement of the destination address of the preset connection function with the target address corresponding to the local server proxy.

Exemplarily, the preset application program may invoke the NetdClientInitConnect method in the NetdClient library, introduce the self-defined connection function, and inject the self-defined connection function into the Bionic library.

Step 204: in accordance with a determination that the preset application program invokes a preset connection function via the second core library, invoke the self-defined connection function instead to replace the destination address of the preset connection function with the target address corresponding to the local server proxy.

Exemplarily, when the preset application program initiates a network request, it may be detected that the preset application program invokes the preset connection function in the Bionic library. In this case, the invoking of the preset connection function is replaced with an invoking of the self-defined connection function to implement the logic required by the acquisition. For example, the destination address in the connect function is replaced with 127.0.0.1.

Step 205: execute a system call of the preset connection function, establish a connection between the preset application program and the local server proxy, and transmit connection information to the local server.

Step 206: establish a connection between the local server proxy and the real server corresponding to the target address via the local server proxy based on the connection information.

As shown in FIG. 3, in the original solution, after invoking the connection function, the application program directly establishes a network connection with the real server (as shown by a dotted line arrow in the figure); while in the embodiment of the present disclosure, by acquiring the connection function, the application program first establishes a connection with the local server proxy, and then the local server proxy establishes a network connection (as shown by a solid-line arrow in the figure) with the real server; after the completion of the establishment of the connection, the local sever proxy, as a relay, forwards data between the application program and the real server, and saves the acquired data packet.

Step 207: obtain a first negotiation result by performing key negotiation with the preset application program via the local server proxy based on the preset digital certificate, and obtain a second negotiation result by performing key negotiation with the real server based on the preset digital certificate.

In the case of encrypted transmission, the preset digital certificate built in the local server is used to perform key negotiation with the preset application program and the real server respectively, to facilitate the subsequent decryption and encryption of data. In a case where the data transmission is ensured safe, real and accurate data is acquired to facilitate subsequent processing of the data such as analysis of the data.

Step 208: decrypt, based on the first negotiation result, first data received from the preset application program via the local server proxy to obtain second data, encrypt the second data based on the second negotiation result to obtain third data, and transmit the third data to the real server; wherein the second data are the data acquired during the procedure of data forwarding.

Step 209: obtain fifth data by decrypting, based on the second negotiation result, the fourth data received from the real server via the local server proxy, obtain sixth data by encrypting the fifth data based on the first negotiation result, and transmit the sixth data to the real server; wherein the fifth data are the data acquired during the procedure of data forwarding.

Optionally, after the second data and the fifth data being acquired, the second data and the fifth data may be analyzed according to a preset data analysis strategy, such as detecting whether there is abnormality or the like.

In the data acquisition method provided by the embodiment of the present disclosure, after the application program is activated, the address of the NetdClientInitConnect method in the NetdClient library is sought for, and the self-defined connection function for achieving a designation address replacement logic is injected into the Bionic library by invoking the NetdClientInitConnect method; then the preset application program initiates a network request, and upon invoking the original connection function in the Bionic library, replaces it with the invoking of the self-defined connection function to achieve the replacement of the destination address, thereby completing the connection between the preset application program and the local serve proxy. The acquisition manner of acquiring the connection function requires few injections of codes, and can ensure the stability and performance of the application program. In addition, the local server proxy has a built-in preset digital certificate, which may realize the decryption and encryption of network data, so that in a case where data transmission is ensured safe, more real and accurate network data transmitted between the preset application program and the real server can be acquired in the preset application program to facilitate subsequent processing of the data such as analysis of the data.

Figure 4:
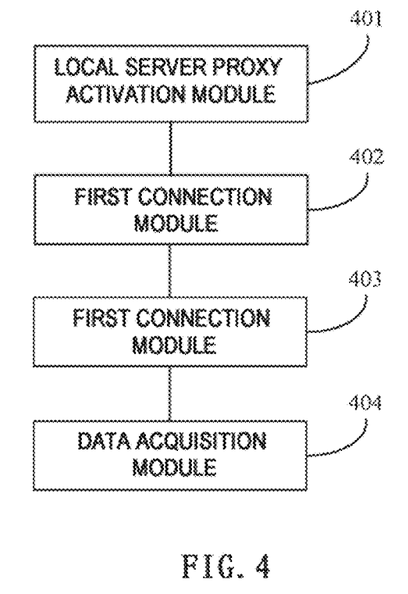
FIG. 4 is a structural block diagram of a data acquisition apparatus according to an embodiment of the present disclosure.

FIG. 4 is a structural block diagram of a data acquisition apparatus according to an embodiment of the present disclosure. The apparatus may be configured in a preset application program, may be implemented by software and/or hardware, and can generally be integrated in an electronic device, and is configured to perform data acquisition by performing a method of data acquisition. As shown in FIG. 4, the apparatus comprises: a local server proxy activation module 401 configured to activate a local server proxy in a preset application program; a first connection module 402 configured to, in accordance with a determination that the preset application program invokes a preset connection function, acquire the preset connection function, and replace a destination address in the preset connection function with a target address corresponding to the local server proxy, to establish a connection between the preset application program and the local server proxy, wherein the target address is pre-written in the preset application program; a second connection module 403 configured to establish a connection between the local server proxy and a real server corresponding to the target address based on connection information received from the preset application program via the local server proxy; a data acquisition module 404 configured to acquire data during a procedure of data forwarding between the real server and the preset application program via the local server proxy.

By employing the data acquisition apparatus according to the embodiment of the present invention, the acquisition mechanism may be realized in the application program without the aid of an external tool, and the data may be forwarded between the application program and the real server by using the local server proxy in the application program, and more accurate network data with stronger readability can be achieved in the forwarding process to facilitate data analysis.

Optionally, the local server proxy has a built-in preset digital certificate, and the data acquisition module comprises: a first negotiation unit configured to obtain a first negotiation result by performing key negotiation with the preset application program via the local server proxy based on the preset digital certificate; a second negotiation unit configured to obtain a second negotiation result by performing key negotiation with the real server via the local server proxy based on the preset digital certificate; a first data acquisition unit configured to decrypt, based on the first negotiation result, first data received from the preset application program via the local server proxy to obtain second data, encrypt the second data based on the second negotiation result to obtain third data, and transmit the third data to the real server; wherein the second data are the data acquired during the procedure of data forwarding.

Optionally, the data acquisition module further comprises: a second data acquisition unit configured to obtain fifth data by decrypting, based on the second negotiation result, the fourth data received from the real server via the local server proxy, obtain sixth data by encrypting the fifth data based on the first negotiation result, and transmit the sixth data to the real server; where the fifth data are the data acquired during the procedure of data forwarding.

Optionally, the apparatus further comprises: a loading module configured to, before determining that the preset application program invokes the preset connection function, load a first core library into the preset application program, wherein the first core library performs centralized management of the invoking of a preset socket by injecting a proxy connection function in the first core library into a second core library, the second core library contains a preset connection function for establishing a connection to the preset socket; an injecting module configured to inject a self-defined connection function into the second core library based on a preset injection approach corresponding to the proxy connection function, where replacing the destination address with the target address comprises: in accordance with a determination that the preset application program invokes a preset connection function via the second core library, invoking the self-defined connection function instead to replace the destination address of the preset connection function with the target address corresponding to the local server proxy.

Optionally, the preset injection approach comprises a approach provided by an operating system for injecting the proxy connection function into the second core library.

Optionally, injecting the self-defined connection function into the second core library comprises: searching for an address of the preset injection approach corresponding to the proxy connection function by using a preset dynamic library symbol function; and invoking the preset injection approach based on the address of the preset injection approach to inject the self-defined connection function into the second core library.

Optionally, the apparatus further comprises: a system call execution module configured to execute a system call of the preset connection function after invoking the self-defined connection function.

Optionally, the operating system comprises an Android operating system, the first core library comprises a NetdClient library, the second core library comprises a Bionic library, and the preset injection approach comprises a NetdClientInitConnect method.

Figure 5:
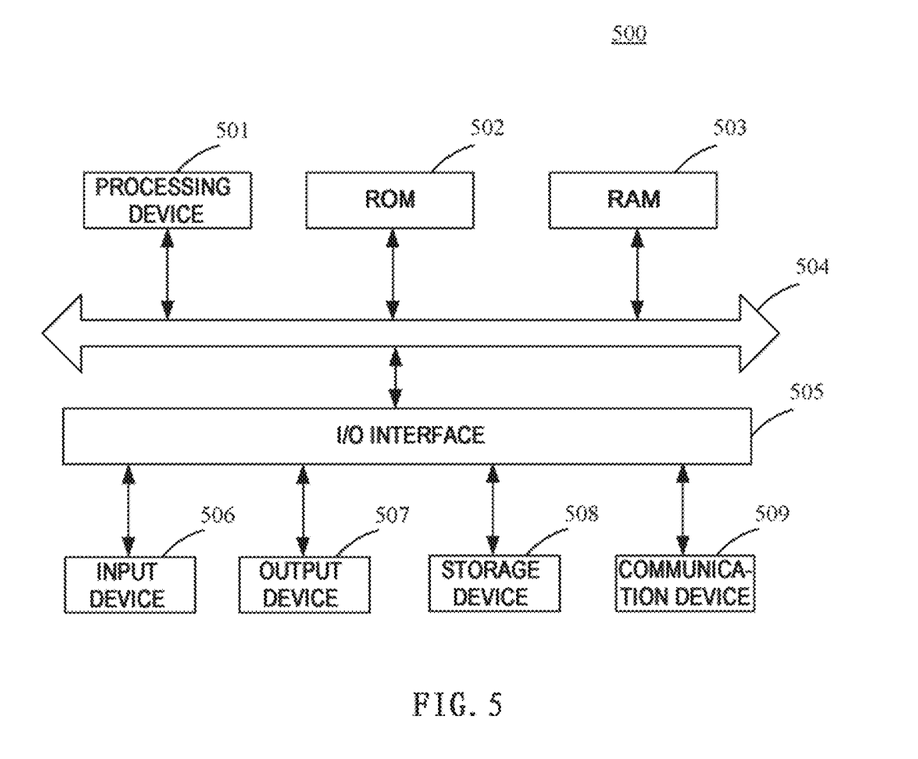
FIG. 5 is a structural block diagram of an electronic device according to an embodiment of the present disclosure.

Then referring to FIG. 5, FIG. 5 shows a structural block diagram of an electronic device according to an embodiment of the present disclosure. The electronic device in the embodiments of the present disclosure may include, but is not limited to a mobile terminal such as a mobile phone, a notebook computer, a digital broadcast receivers, a PDA (personal Digital Assistant), a PAD (a tablet computer), a PMP (Portable Multimedia Player), an in-vehicle terminal (e.g., an in-vehicle navigation terminal) and a stationary terminal such as a digital TV, a desktop computer, and the like. The electronic device shown in FIG. 5 is only an example, and should not impose any limitation on the function and scope of use of the embodiments of the present disclosure.

As shown in FIG. 5, an electronic device 500 may include a processing device (e.g., a central processing device, a graphics processor, etc.) 501 that may perform various appropriate actions and processing based on a program stored in a read-only memory (ROM) 502 or a program loaded from a storage device 408 to a random access memory (RAM) 503. In the RAM 503, there further store various programs and data needed for operations of the device 500. The processing device 501, ROM 502 and RAM 503 are connected to each other via a bus 504. An input/output (I/O) interface 505 is also connected to the bus 504.

Usually, the following components may be connected to the I/O interface 505: an input device 506 such as a touch screen, a touchpad, a keyboard, a mouse, a camera, a microphone, an accelerometer and a gyroscope; an output device 507 such as a liquid crystal display (LCD), a speaker and a vibrator; a storage device 508 such as a magnetic tape and a hard disk; and a communication device 509 which may allow the electronic device 500 to perform wireless or wired communication with other devices to exchange data. Although FIG. 5 shows the electronic device 500 having various means, it should be appreciated that not all of the illustrated means are required to be implemented or provided. More or fewer means may alternatively be implemented or provided.

In particular, according to embodiments of the present disclosure, the process described above with reference to the flowchart may be implemented as a computer software program. For example, embodiments of the present disclosure include a computer program product comprising a computer program carried on a non-transitory computer readable medium, the computer program containing program code for performing the method illustrated in the flowchart. In such an embodiment, the computer program may be downloaded and installed from the network via the communication device 509, or installed from the Storage device 508, or installed from the ROM 502. When the computer program is executed by the processing device 501, the above functions defined in the method of the embodiments of the present disclosure are performed.

It needs to be appreciated that the above computer readable storage medium in the present disclosure may be a computer readable signal medium or a computer readable storage medium or any combination of the computer readable signal medium and the computer readable storage medium. The computer-readable storage medium can be, for example, but not limited to, an electrical, magnetic, optical, electromagnetic, infrared, or semiconductor system, apparatus or device, or a combination of any of the above. More specific examples of the computer readable storage medium may include, but are not limited to an electrically connected, portable computer magnetic disk, hard disk, Random Access Memory (RAM), Read Only Memory (ROM), Erasable Programmable Read Only Memory (EPROM or flash memory), optical fiber, portable Compact Disk Read Only Memory (CD-ROM), optical storage device, magnetic storage device having one or more lead wires, or any suitable combinations of the above. In the present disclosure, a computer-readable storage medium may be any tangible medium that contains or stores a program that a program for use by or in connection with an instruction execution system, apparatus, or device. However, in the present disclosure, the computer-readable signal medium may include a data signal propagated in baseband or as part of a carrier wave with the computer-readable program code embodied thereon. Such propagated data signals may take a variety of forms, including but not limited to electromagnetic signals, optical signals, or any suitable combination of the foregoing. A computer-readable signal medium can also be any computer-readable medium other than the computer-readable storage medium, which can communicate, propagate, or transport a program for use by or in connection with an instruction execution system, apparatus, or device. Program code embodied on a computer readable medium may be transmitted using any appropriate medium, including but not limited to wireline, optical fiber cable, RF, etc., or any suitable combination of the foregoing.

The above-mentioned computer-readable medium may be included in the above-mentioned electronic device; or may exist alone without being assembled into the electronic device.

The above-mentioned computer-readable medium carries one or more programs which, when executed by the electron device, causes the electronic device to: activate a local server proxy in a preset application program; in accordance with a determination that the preset application program invokes a preset connection function, acquire the preset connection function, and replace a destination address in the preset connection function with a target address corresponding to the local server proxy, to establish a connection between the preset application program and the local server proxy, wherein the target address is pre-written in the preset application program; receive connection information transmitted by the preset application program via the local server proxy, and establish a connection between the local server proxy and the real server corresponding to the target address based on the connection information; forward data between the real server and the preset application program via the local server proxy, and acquire data during the forwarding process.

Computer program code for carrying out operations for aspects of the present invention may be written in any combination of one or more programming languages, including an object oriented programming language such as Java, Smalltalk, C++ or the like and conventional procedural programming languages, such as the "C" programming language or assembly language or similar programming languages. The computer readable program instructions may execute entirely on the user's computer, partly on the users computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code that contains one or more executable instructions for implementing specified logic functions. It should also be noted that, in some alternative implementations, the functions annotated in the blocks may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowcharts, and combinations of blocks in the block diagrams and/or flowcharts, can be implemented in dedicated hardware-based systems that perform the specified functions or operations, or can be implemented in a combination of dedicated hardware and computer instructions.

The modules involved in the embodiments of the present disclosure may be implemented in software or hardware. Wherein, the names of the modules do not constitute a limitation of the modules themselves under certain circumstances. For example, the local server proxy activation module can also be described as "a module for activating the local server proxy in a preset application program".

The functions described herein above may be performed, at least in part, by one or more hardware logic components. For example, without limitation, exemplary types of hardware logic components that may be used include: Field Programmable Gate Array (FPGA), Application Specific Integrated Circuit (ASIC), Application Specific Standard Product (ASSP), System on Chip (SOC), Load programmable logic device (CPLD) and so on.

In the context of the subject matter described herein, the machine-readable medium may be any tangible medium including or storing a program for or about an instruction executing system, apparatus or device. The machine-readable medium may be a machine-readable signal medium or machine-readable storage medium. The machine-readable medium may include, but not limited to, electronic, magnetic, optical, electro-magnetic, infrared, or semiconductor system, apparatus or device, or any appropriate combination thereof. More detailed examples of the machine-readable storage medium include, an electrical connection having one or more wires, a portable computer magnetic disk, hard drive, random-access memory (RAM), read-only memory (ROM), erasable programmable read-only memory (EPROM or flash memory), optical fiber, a portable compact disc read-only memory (CD-ROM), an optical storage device, a magnetic storage device, or any suitable combination of the foregoing.

According to one or more embodiments of the present disclosure, there is provided a method of data acquisition, comprising: activating a local server proxy in a preset application program; in accordance with a determination that the preset application program invokes a preset connection function, acquiring the preset connection function, and replacing a destination address in the preset connection function with a target address corresponding to the local server proxy, to establish a connection between the preset application program and the local server proxy, wherein the target address is pre-written in the preset application program; establishing a connection between the local server proxy and a real server corresponding to the target address based on connection information received from the preset application program via the local server proxy; and acquiring data during a procedure of data forwarding between the real server and the preset application program via the local server proxy.

Furthermore, the local server proxy has a built-in preset digital certificate, and acquiring the data comprises: obtaining a first negotiation result by performing key negotiation with the preset application program via the local server proxy based on the preset digital certificate; obtaining a second negotiation result by performing key negotiation with the real server via the local server proxy based on the preset digital certificate; decrypting, based on the first negotiation result, first data received from the preset application program via the local server proxy to obtain second data; encrypting the second data based on the second negotiation result to obtain third data; and transmitting the third data to the real server; where the second data are the data acquired during the procedure of data forwarding.

Furthermore, acquiring the data further comprises: obtaining fifth data by decrypting, based on the second negotiation result, the fourth data received from the real server via the local server proxy; obtaining sixth data by encrypting the fifth data based on the first negotiation result; and transmitting the sixth data to the real server; where the fifth data are the data acquired during the procedure of data forwarding.

Furthermore, the method further comprises: before determining that the preset application program invokes the preset connection function, loading a first core library into the preset application program, wherein the first core library performs centralized management of the invoking of a preset socket by injecting a proxy connection function in the first core library into a second core library, the second core library contains a preset connection function for establishing a connection to the preset socket; injecting a self-defined connection function into the second core library based on a preset injection approach corresponding to the proxy connection function, where replacing the destination address with the target address comprises: in accordance with a determination that the preset application program invokes a preset connection function via the second core library, invoking the self-defined connection function instead to replace the destination address of the preset connection function with the target address corresponding to the local server proxy.

Furthermore, the preset injection approach comprises a approach provided by an operating system for injecting the proxy connection function into the second core library; where injecting the self-defined connection function into the second core library comprises: searching for an address of the preset injection approach corresponding to the proxy connection function by using a preset dynamic library symbol function; and invoking the preset injection approach based on the address of the preset injection approach to inject the self-defined connection function into the second core library.

Furthermore, the method further comprises: after invoking the self-defined connection function, executing a system call of the preset connection function.

Furthermore, the operating system comprises an Android operating system, the first core library comprises a NetdClient library, the second core library comprises a Bionic library, and the preset injection approach comprises a NetdClientInitConnect method.

According to one or more embodiments of the present disclosure, there is provided a data acquisition apparatus, comprising: a local server proxy activation module configured to activate a local server proxy in a preset application program; a first connection module configured to, in accordance with a determination that the preset application program invokes a preset connection function, acquire the preset connection function, and replace a destination address in the preset connection function with a target address corresponding to the local server proxy, to establish a connection between the preset application program and the local server proxy, wherein the target address is pre-written in the preset application program; a second connection module configured to establish a connection between the local server proxy and a real server corresponding to the target address based on connection information received from the preset application program via the local server proxy; a data acquisition module configured to acquire data during a procedure of data forwarding between the real server and the preset application program via the local server proxy.

The above description is merely a preferred embodiment of the present disclosure and an illustration of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, the technical solutions formed by the above-mentioned technical features or Other technical solutions formed by any combination of its equivalent features. For example, a technical solution is formed by replacing the above features with the technical features disclosed in the present disclosure (but not limited to) with similar functions.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter disclosed herein or of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or methodological actions, it should be understood that the subject matters specified in the appended claims are not limited to the specific features or actions described above. Rather, the specific features and actions described above are disclosed as example forms of implementing the claims.

The invention claimed is:

1. A method of data acquisition, comprising:
activating a local server proxy in a preset application program;
in accordance with a determination that the preset application program invokes a preset connection function, acquiring the preset connection function, and replacing a destination address in the preset connection function with a target address corresponding to the local server proxy, to establish a connection between the preset application program and the local server proxy, wherein the preset connection function is a connection function called when the preset application program initiates a network request, the destination address is an address of a remote server with which the preset application program needs to establish a network connection, and the target address is pre-written in the preset application program;
establishing a connection between the local server proxy and a real server corresponding to the target address based on connection information received from the preset application program via the local server proxy; and
acquiring data during a procedure of data forwarding between the real server and the preset application program via the local server proxy,
wherein the method further comprises: before determining that the preset application program invokes the preset connection function,
loading a first core library into the preset application program, wherein the first core library performs centralized management of the invoking of a preset socket by injecting a proxy connection function in the first core library into a second core library, the second core library contains a preset connection function for establishing a connection to the preset socket and
injecting a self-defined connection function into the second core library based on a preset injection approach corresponding to the proxy connection function,
wherein replacing the destination address with the target address comprises:
in accordance with a determination that the preset application program invokes a preset connection function via the second core library, invoking the self-defined connection function instead to replace the destination address of the preset connection function with the target address corresponding to the local server proxy.

2. The method according to claim 1, wherein the local server proxy has a built-in preset digital certificate, and acquiring the data comprises:
obtaining a first negotiation result by performing key negotiation with the preset application program via the local server proxy based on the preset digital certificate;
obtaining a second negotiation result by performing key negotiation with the real server via the local server proxy based on the preset digital certificate;
decrypting, based on the first negotiation result, first data received from the preset application program via the local server proxy to obtain second data;
encrypting the second data based on the second negotiation result to obtain third data; and
transmitting the third data to the real server;
wherein the second data are the data acquired during the procedure of data forwarding.

3. The method according to claim 2, wherein acquiring the data further comprises:
obtaining fifth data by decrypting, based on the second negotiation result, the fourth data received from the real server via the local server proxy;
obtaining sixth data by encrypting the fifth data based on the first negotiation result; and
transmitting the sixth data to the real server;
wherein the fifth data are the data acquired during the procedure of data forwarding.

4. The method according to claim 3, wherein the preset injection approach comprises an approach provided by an operating system for injecting the proxy connection function into the second core library;
wherein injecting the self-defined connection function into the second core library comprises:

searching for an address of the preset injection approach corresponding to the proxy connection function by using a preset dynamic library symbol function; and invoking the preset injection approach based on the address of the preset injection approach to inject the self-defined connection function into the second core library.

5. The method according to claim 3, further comprising: after invoking the self-defined connection function, executing a system call of the preset connection function.

6. The method according to claim 3, wherein the operating system comprises an Android operating system, the first core library comprises a NetdClient library, the second core library comprises a Bionic library, and the preset injection approach comprises a NetdClientlnitConnect method.

7. The method according to claim 2, wherein the preset injection approach comprises an approach provided by an operating system for injecting the proxy connection function into the second core library;

wherein injecting the self-defined connection function into the second core library comprises:

searching for an address of the preset injection approach corresponding to the proxy connection function by using a preset dynamic library symbol function; and invoking the preset injection approach based on the address of the preset injection approach to inject the self-defined connection function into the second core library.

8. The method according to claim 2, further comprising: after invoking the self-defined connection function, executing a system call of the preset connection function.

9. The method according to claim 2, wherein the operating system comprises an Android operating system, the first core library comprises a NetdClient library, the second core library comprises a Bionic library, and the preset injection approach comprises a NetdClientlnitConnect method.

10. The method according to claim 1, wherein the preset injection approach comprises an approach provided by an operating system for injecting the proxy connection function into the second core library;

wherein injecting the self-defined connection function into the second core library comprises:

searching for an address of the preset injection approach corresponding to the proxy connection function by using a preset dynamic library symbol function; and invoking the preset injection approach based on the address of the preset injection approach to inject the self-defined connection function into the second core library.

11. The method according to claim 1, further comprising: after invoking the self-defined connection function, executing a system call of the preset connection function.

12. The method according to claim 1, wherein the operating system comprises an Android operating system, the first core library comprises a NetdClient library, the second core library comprises a Bionic library, and the preset injection approach comprises a NetdClientlnitConnect method.

13. An electronic device, comprising:
a memory; and
a processor, wherein the memory is used to store one or more computer instructions which, when executed by the processor, cause the processor to perform a method comprising:

activating a local server proxy in a preset application program;

in accordance with a determination that the preset application program invokes a preset connection function, acquiring the preset connection function, and replacing a destination address in the preset connection function with a target address corresponding to the local server proxy, to establish a connection between the preset application program and the local server proxy, wherein the preset connection function is a connection function called when the preset application program initiates a network request, the destination address is an address of a remote server with which the preset application program needs to establish a network connection, and the target address is pre-written in the preset application program;

establishing a connection between the local server proxy and a real server corresponding to the target address based on connection information received from the preset application program via the local server proxy; and acquiring data during a procedure of data forwarding between the real server and the preset application program via the local server proxy, wherein the method further comprises: before determining that the preset application program invokes the preset connection function, loading a first core library into the preset application program, wherein the first core library performs centralized management of the invoking of a preset socket by injecting a proxy connection function in the first core library into a second core library, the second core library contains a preset connection function for establishing a connection to the preset socket and injecting a self-defined connection function into the second core library based on a preset injection approach corresponding to the proxy connection function, wherein replacing the destination address with the target address comprises:

in accordance with a determination that the preset application program invokes a preset connection function via the second core library, invoking the self-defined connection function instead to replace the destination address of the preset connection function with the target address corresponding to the local server proxy.

14. A computer program product comprising a non-transitory computer readable storage medium storing one or more computer instructions thereon which are executed by a processor to:

activate a local server proxy in a preset application program;

in accordance with a determination that the preset application program invokes a preset connection function, acquire the preset connection function, and replacing a destination address in the preset connection function with a target address corresponding to the local server proxy, to establish a connection between the preset application program and the local server proxy, wherein the preset connection function is a connection function called when the preset application program initiates a network request, the destination address is an address of a remote server with which the preset application program needs to establish a network connection, and the target address is pre-written in the preset application program;

establish a connection between the local server proxy and a real server corresponding to the target address based on connection information received from the preset application program via the local server proxy; and acquire data during a procedure of data forwarding between the real server and the preset application program via the local server proxy, wherein the method further comprises: before determining that the preset application program invokes the preset connection function, loading a first core library into the preset application program, wherein the first core library performs centralized management of the invoking of a preset socket by injecting a proxy connection function in the first core library into a second core library, the second core library contains a preset connection function for establishing a connection to the preset socket and injecting a self-defined connection function into the second core library based on a preset injection approach corresponding to the proxy connection function, wherein replacing the destination address with the target address comprises:

in accordance with a determination that the preset application program invokes a preset connection function via the second core library, invoking the self-defined connection function instead to replace the destination address of the preset connection function with the target address corresponding to the local server proxy.

15. The computer program product of claim 14, wherein the local server proxy has a built-in preset digital certificate, and acquiring the data comprises:

obtaining a first negotiation result by performing key negotiation with the preset application program via the local server proxy based on the preset digital certificate;

obtaining a second negotiation result by performing key negotiation with the real server via the local server proxy based on the preset digital certificate;

decrypting, based on the first negotiation result, first data received from the preset application program via the local server proxy to obtain second data;

encrypting the second data based on the second negotiation result to obtain third data; and transmitting the third data to the real server;

wherein the second data are the data acquired during the procedure of data forwarding.

16. The computer program product of claim 15, wherein acquiring the data further comprises:

obtaining fifth data by decrypting, based on the second negotiation result, the fourth data received from the real server via the local server proxy;

obtaining sixth data by encrypting the fifth data based on the first negotiation result; and transmitting the sixth data to the real server;

wherein the fifth data are the data acquired during the procedure of data forwarding.

* * * * *